April 30, 1968     H. H. YANOW     3,380,602
CARGO HANDLING APPARATUS
Filed July 19, 1965     3 Sheets-Sheet 1
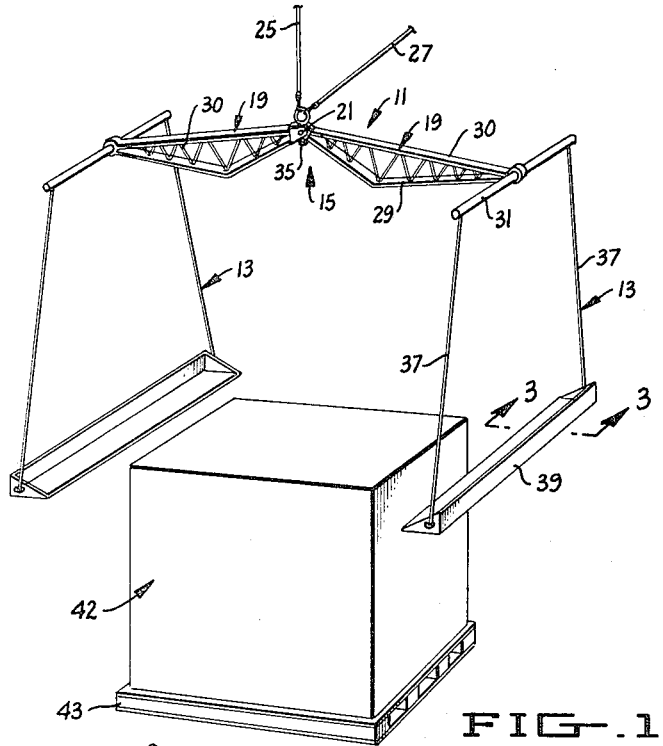
FIG. 1.
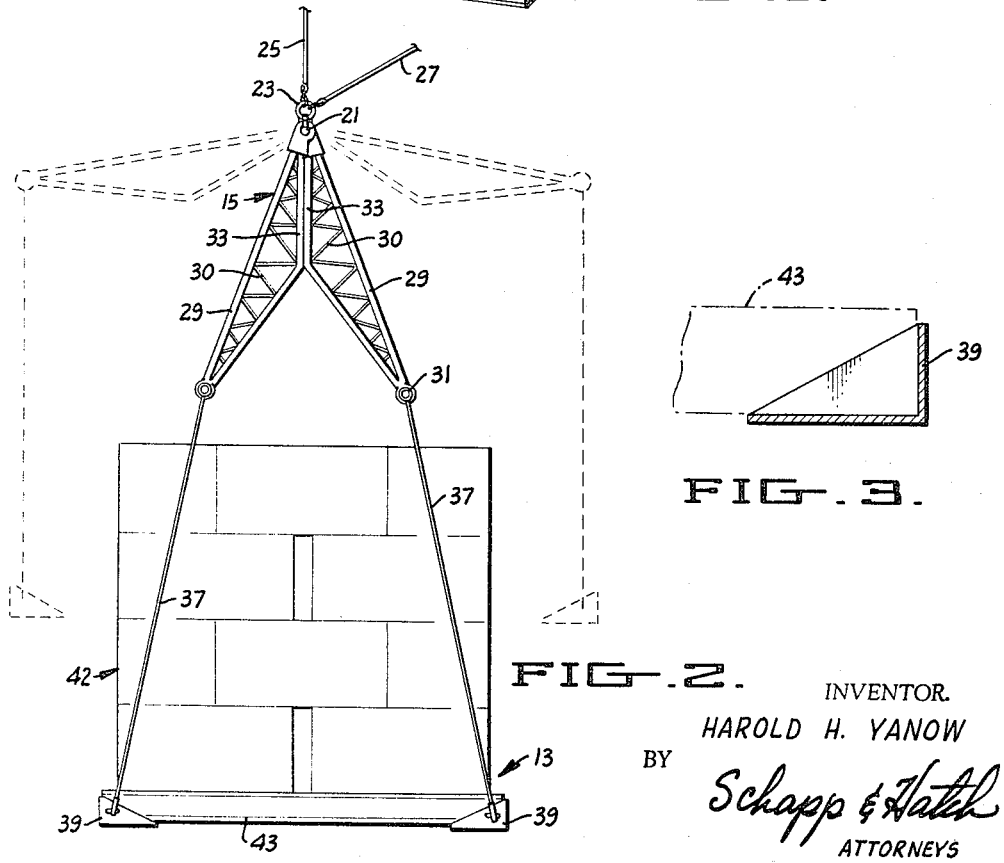
FIG. 2.
FIG. 3.
INVENTOR.
HAROLD H. YANOW
BY
Schapp & Hatch
ATTORNEYS April 30, 1968  H. H. YANOW  3,380,602
CARGO HANDLING APPARATUS
Filed July 19, 1965  3 Sheets-Sheet 2
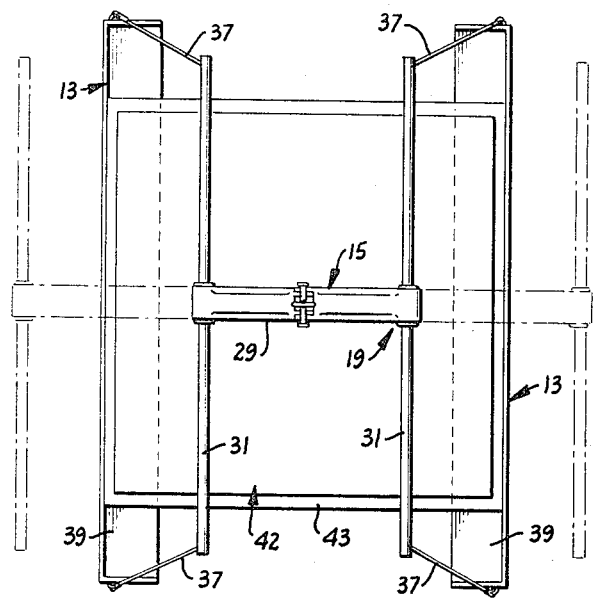
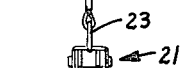
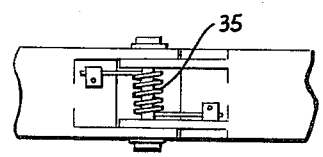
INVENTOR.
HAROLD H. YANOW
BY *Schapp & Hatch*
ATTORNEYS

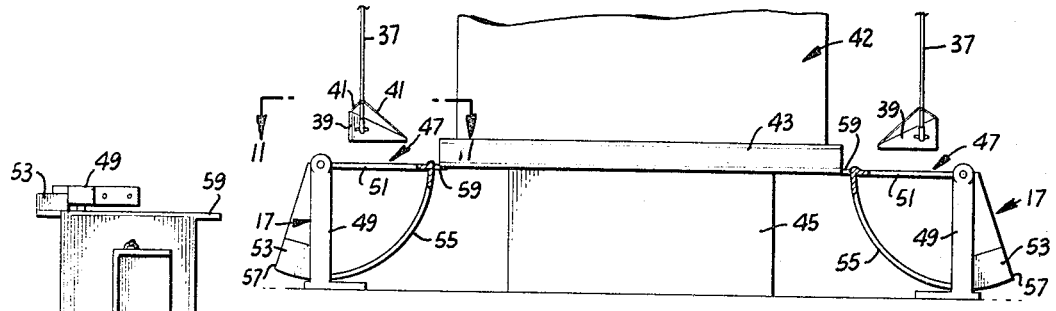
FIG. 7.
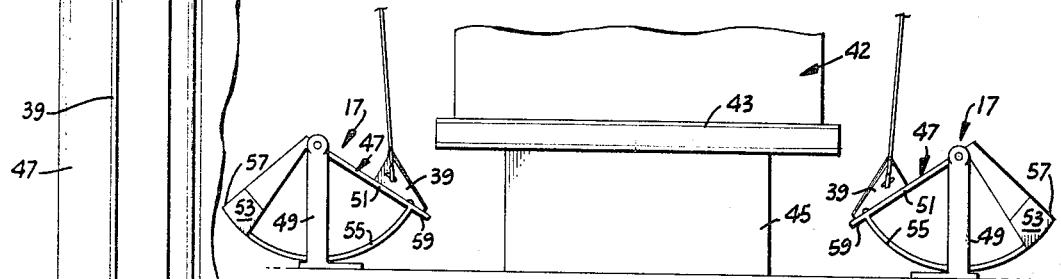
FIG. 8.
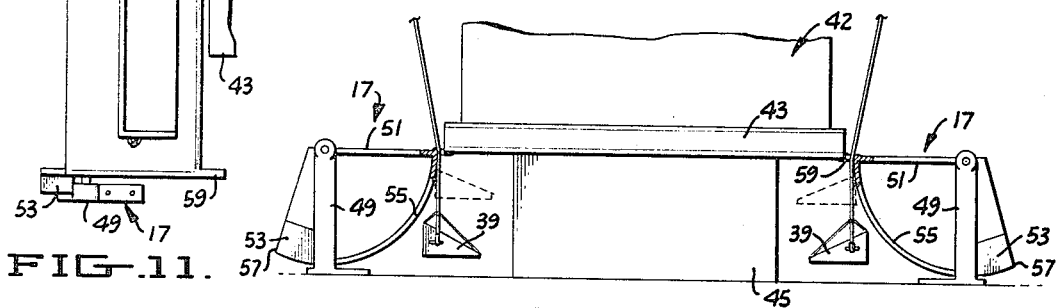
FIG. 9.
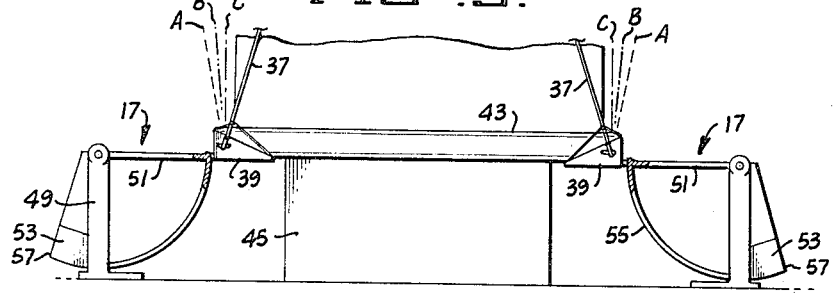
FIG. 10.
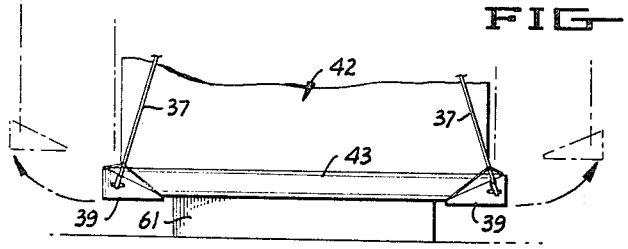
FIG. 11.
FIG. 12.
INVENTOR.
HAROLD H. YANOW
BY
Schapp & Hatch
ATTORNEYS United States Patent Office 3,380,602
Patented Apr. 30, 1968

3,380,602
CARGO HANDLING APPARATUS
Harold H. Yanow, 528 15th Ave.,
San Francisco, Calif. 94118
Filed July 19, 1965, Ser. No. 472,803
16 Claims. (Cl. 214—95)

ABSTRACT OF THE DISCLOSURE

A cargo handling apparatus having a pair of cargo slings suspended from a hoist cable. The cargo slings are suspended from hanger arms which are biased outwardly to hold the cargo slings far enough apart to pass up and down on opposite sides of the cargo to be lifted. When the cargo engaging members are engaged under the opposite ends of a cargo pallet, and upward force is exerted on the hoist cable, the outward bias of the hanger arms is overcome and they move downwardly and together so that inward, as well as upward pull is exerted on the cargo engaging members. As soon as the cargo is set down and the upward force on the hoist cable is slacked off, the hanger arms swing the cargo slings apart so the unit may be lifted away from the cargo which has just been transported. A device is also provided for automatically hooking the cargo engaging members under the opposite ends of the cargo pallet preparatory to lifting the pallet and the cargo contained thereon.

---

This invention relates to cargo handling apparatus, and more particularly to apparatus for automatically placing cable bridles in the desired position for lifting cargo, and for automatically releasing the cable bridles after the cargo has been deposited on a ship or dock.

When it is desired to load cargo on a ship, and, more specifically, to transfer cargo from a dock to the hold of a ship or vice versa, the cargo is often first piled on pallets either on the dock or in the hold of the ship. The loaded pallets are then lifted individually by means of a cable connected to a lifting device, such as a winch.

The lifting cable is attached to the pallet by slings commonly referred to as bridles. Each of these bridles conventionally consists of a rigid member connected at its ends to sections of cable which in turn are joined together at their other ends by a ring or the like. The ring is then engaged by a hook attached to the lifting cable. Normally, there are two bridles used for lifting a pallet, the bridles extending under opposite sides of the pallet and being held in this position by translated forces when the load is supported thereon.

There are several different types of bridles, one of which includes a pair of cables connected to a bar extending between the cables. Another type of bridle includes a pair of cables having a scoop connected between the cables which is adapted for nestingly receiving the edges of a pallet on which cargo is loaded.

The palleted loads are presently deposited on the floor of the hold or on the dock and after the bridles are manually released, the loads are lifted by fork lifts or lift jitneys and are placed in the desired stowed position. However, one of the disadvantages of the present system is the difficulty normally encountered in releasing the bridles after the cargo has been set down. Usually, it is necessary to station one or more workmen in the hold or on the dock to disengage the bridles from the pallet and to keep them from getting caught on the cargo as the lifting cable is hoisted. It is necessary to do this since both of the bridles are normally joined together and to the main lifting cable at the same point, and the bridles tend to swing toward each other and consequently toward the cargo when they are raised. If the bridles were to catch the cargo as they are raised, they might tear it or tip it over.

Another disadvantage of the present system is the difficulty normally encountered in attaching the bridles to the cargo in order to lift the latter. In this regard, it normally has been necessary to station the one or more workmen adjacent the load to be lifted for positioning the bridles under the palleted cargo. Thus, it is necessary to have workmen stationed both at the loading and unloading stations as bridle tenders. If these workmen could be relieved of their bridle tending duties, they could perform other necessary ship loading or unloading jobs, thereby reducing the cost of loading or unloading.

In my co-pending application Ser. No. 469,160 filed July 2, 1965, now abandoned, entitled A Cargo Receiving Platform, there is disclosed a device which is adapted to automatically release cable bridles after palleted cargo has been deposited on a platform, thereby eliminating the need for a workman or workmen to disengage the bridles. The present invention is an improvement in a bridle release apparatus, and also functions automatically to position the bridles in cargo lifting position adjacent a pallet, thereby eliminating the need for workmen to act as bridle tenders.

One of the primary objects of this invention is the provision of cargo handling apparatus for automatically releasing cable bridles after palleted cargo has been deposited on a dock or in the hold of a ship.

Another object of the invention is a provision of cargo handling apparatus such as described which has means for automatically positioning the bridles in cargo lifting position.

A further object of the invention is the provision of a cargo handling apparatus such as described which may be utilized both in the hold of a ship and on the dock.

A still further object of the invention is the provision of cargo handling apparatus such as described which is simple and economical in construction, yet is sturdy and reliable in operation.

Further objects and advantages of my invention will appear as the specification continues, and the new and useful features of the cargo handling apparatus will be fully defined in the claims attached hereto.

In the accompanying drawings, in which one of various possible embodiments of the invention is illustrated, FIGURE 1 is a perspective view illustrating a portion of the apparatus of this invention;

FIGURE 2 is an end view in elevation of the apparatus of this invention shown in solid lines in pallet lifting position and in broken lines in pallet disengaging position;

FIGURE 3 is a enlarged section taken on line 3—3 of FIGURE 1;

FIGURE 4 is a plan view of FIGURE 2;

FIGURE 5 is a side view of FIGURE 2;

FIGURE 6 is an enlarged fragmentary view taken on line 6—6 of FIGURE 1;

FIGURES 7–10 are fragmentary side elevations illustrating sequential steps in the connection of the apparatus of this invention to a cargo load;

FIGURE 11 is a fragmentary view taken along line 11—11 of FIGURE 7; and

FIGURE 12 is a fragmentary side view similar to FIGURES 7–10 illustrating the disengagement of the apparatus of this invention from a palleted load.

Referring now to the drawings, a cargo handling apparatus of this invention which is adapted to be connected to a lifting device, such as a hoist, is generally indicated at 11 and basically comprises a pair of bridles 13 connected together and adapted to be positioned adjacent cargo in cargo engaging position for carrying the latter, and means 15 biasing the bridles apart when the latter are lowered from cargo engaging position to permit automatic removal of the bridles. As illustrated in FIGURES 7–11, the apparatus 11 also includes means 17 for guiding the bridles under a palleted load of cargo after the bridles have been lowered below the cargo, thereby automatically placing the bridles in cargo lifting position.

More specifically, the means 15 of apparatus 11 here includes a pair of hanger members 19 which are hinged together at 21 and which are attached to a ring 23 of a cable 25 of a lifting device (not shown). A guiding or stabilizing cable 27 is also connected to ring 23 for preventing rotational movement of the cargo as it is transferred from dock to hold or vice versa. Each hanger 19 includes a truss-shaped arm 29 having a plurality of strengthening ribs 30 and a bridle support 31 extending generally perpendicular to the arm 29 at the outer end of the latter for supporting bridles 13.

The arms 29 are constructed so as to have stop plates 33 adapted to abut one another when the outer ends of the hangers are moved toward one another. Means, such as a coiled torsion spring 35, is provided at the juncture of the arms 29 (see FIGURE 6) for biasing the outer ends of the two arms away from one another toward the position illustrated in FIGURE 1 for separating the bridles 13. The dimensions of the arms 29 are such that the bridles are normally spaced apart by a distance greater than the length of a side of the cargo so that the bridles, when lowered or raised past a load of cargo, will not snag the cargo.

Each bridle includes two cables 37 which are secured to the outer ends of a respective bridle support 31. As here shown, the lower ends of the cables 37 of each bridle are connected to the ends of a scoop member 39 which is adapted to be moved into nesting relation with the lower edges of a palleted load. Small resilient balancing cords 41 (see FIGURE 7) are connected between the cables 37 and the adjacent ends of the scoops 39 to maintain the latter in a relatively horizontal position as the bridles are lowered.

The cargo is designated 42 and includes a pallet 43 which is adapted to rest on a table 45 located on the dock or in the hold of a ship.

The guide means 17 is shown in FIGURES 7–11 to include two plate members 47 pivotally mounted between posts 49 adapted to be temporarily or permanently secured to the docks or in the hold of a ship. The plate members 47 include a horizontal portion 51 which is counter-weighted at 53 to maintain the horizontal portions 51 in their generally horizontal position unless weight is placed thereon. A guiding or blocking portion 55 curves downwardly from the inner end of each portion 51 toward the adjacent posts 49. The guiding portions 55 include ears 57 which are adapted to engage the posts 49 for preventing the plate members 47 from swinging upwardly beyond the position illustrated in FIGURE 7. End fingers 59 extend toward the pallet 43 from opposite ends of the plate member 47 to prevent the cables 37 of bridles 13 from being inadvertently pulled around the end corners of the plate members 47 and becoming entangled therewith.

A table 61 is shown in FIGURE 12 for receiving a palleted load either on the dock or in the hold of a ship. The table 61 may be freely movable about so that the loads may be deposited wherever it is desired.

Assuming it is desired to transfer a load of cargo from the dock to the hold of a ship, the plate members 47 and the table 45 are first set up in a desired position on the dock and the table 61 is placed in the desired position in a hold of a ship, and operation of the apparatus is as follows: First, a load of cargo 42 on a pallet 43 is placed by a fork lift or the like on table 45. The apparatus, in the position illustrated in FIGURE 1, is lowered to the position illustrated in FIGURE 7. At this point, the plate members 47 are so positioned that the portions 51 are generally horizontal and adjacent the edges of a palleted load of cargo. The lifting apparatus (not shown) is operated to lower the apparatus of this invention so that the scoops 39 drop onto the plate members 47, thereby causing the latter to swing to the position illustrated in FIGURE 8. As the scoop bridles 39 are lowered farther, they slide off the portions 51 and the plate members 47 return to their FIGURE 7 position, while the scoop bridles 39 assume the position shown in solid lines in FIGURE 9. After dropping off the edges of the portions 51 of the plate members 47, the elastic cords 41 return the scoops 39 to their generally horizontal position.

The lifting apparatus is then operated to lift the cable 25 and this causes the scoops 39 to move upwardly, first to the dotted line position illustrated in FIGURE 9 and then to the solid line position illustrated in FIGURE 10, as a result of the engagement of the guiding portions 55 with the scoops 39. When the scoops 39 first arrive in nesting relationship with the pallet 43, as illustrated in FIGURE 10, the cables 37 extend generally along the lines indicated at A in FIGURE 10 since the arms 29 are still in the position illustrated in FIGURE 1. As the cable 25 is raised farther, the arms 29 are forced toward one another against the biasing action of torsion spring 35 and the cables 47 move through positions indicated by lines B and C until the arms 29 assume the position illustrated in FIGURE 2 and the cables 37 assume a position shown in solid lines in FIGURES 2 and 10. Continued upward movement of the cable 25 causes the apparatus 11 to lift the cargo off the table 25, and the cargo is then transferred to the ship's hold. When the cargo is lowered into the ship's hold, it is set down on the table 61 (FIGURE 12). As the cable 25 is lowered further, and the weight of the cargo is transferred from the scoops 39 to the table 61, the torsion spring 35 causes the arms 29 to return to their FIGURE 1 position, thereby urging the scoops away from the cargo so that the latter may be withdrawn upwardly in a generally vertical direction past the side edges of the cargo without getting caught on the latter.

While a scoop bridle has been illustrated in the drawings, it will be understood that other types of bridles could be utilized with equal success. Accordingly, the term "bridle" as used herein and in the claims is meant to refer to any type of sling which may be used for lifting cargo in the manner described.

In view of the foregoing, it will be seen that the cargo handling apparatus of this invention will both automatically connect or place bridles in cargo lifting position without the need for additional workmen at the loading station, and release the bridles after cargo has been deposited on a platform, thereby eliminating the need for workmen at the unloading station. Thus, a loading or unloading operation may be carried out without the need for any workmen other than the fork lift driver needed for placing the cargo on the table 45 and the fork lift driver needed for removing it from table 61, and the lifting device operator. The workmen presently needed for placing the bridles on the cargo and the workmen needed for removing the bridles from the cargo are freed to perform other jobs.

As various changes could be made in the above constructions without departing from the scope of the invention, it is intended that all matter contained in the above description or shown in the accompanying drawings shall be interpreted as illustrative and not in a limiting sense.

I claim:

1. Cargo handling apparatus adapted to be connected to a lifting device comprising a pair of cargo slings connected together at their upper ends and having horizontally elongated members at their lower ends engaged under opposite ends of a cargo pallet for carrying the latter, and means biasing said cargo slings apart when the latter are moved downwardly from said cargo pallet engaging position so as to permit removal of said cargo slings.

2. Cargo handling apparatus as set forth in claim 1 and further comprising means for guiding said cargo slings under said opposite ends of the cargo pallet prior to lifting.

3. Cargo handling apparatus as set forth in claim 2 wherein said guiding means includes blocking means adapted to permit movement of said cargo slings from above to below said cargo and adapted to block movement of said cargo slings from below to above said cargo.

4. Cargo handling apparatus adapted to be connected to a lifting device comprising a pair of hanger members, means connecting said hanger members together for allowing the outer ends of the latter to swing toward and away from one another, a cargo sling swingably suspended from the outer end of each hanger member, and means biasing the outer ends of said hanger members apart.

5. Cargo handling apparatus as set forth in claim 4 wherein each of said hanger members includes an arm and a cargo sling extending generally perpendicular to said arm at the outer end of the latter, said cargo slings including a pair of suspension members and a cargo support member, said suspension members being connected at one end to said cargo support member and at the other end to the outer ends of said cargo slings.

6. Cargo handling apparatus adapted to be connected to a lifting device comprising a pair of hangers, means connecting said hangers together for allowing the outer ends of the latter to swing toward and away from one another, a bridle suspended from the outer end of each hanger, means biasing the outer ends of said hangers apart for spreading said bridles apart by a distance greater than the length of one side of cargo to be handled to permit said bridles to be lowered on opposite sides of the cargo, and means for guiding said bridles under said cargo after they have been lowered below said cargo.

7. Cargo handling apparatus as set forth in claim 6 wherein said guiding means includes blocking means adapted to permit movement of said bridles from above to below said cargo and adapted to block movement of said bridles from below to above said cargo.

8. Cargo handling apparatus adapted to be connected to a lifting device comprising a pair of hanger members, hinge means connecting said hanger members together, a bridle suspended from the outer end of each member, means biasing the outer ends of said hanger members apart from spreading said bridles apart to permit the latter to pass by cargo in a generally vertical direction on opposite sides of the cargo, means for guiding said bridle into engagement with said cargo for lifting the latter in response to upward movement of said bridles from a position below said cargo, the outer ends of said hanger members moving toward one another when said bridles are in engagement with said cargo and the apparatus is raised by the lifting device, and stop means for limiting the movement of the outer ends of said hanger members toward one another.

9. Cargo handling apparatus as set forth in claim 8 wherein each of said hanger members includes an arm and a bridle support extending generally perpendicular to said arm at the outer end of the latter, said bridles including a pair of cables and a cargo support member, said cables being connected at one end to said cargo support member and at the other end to the outer ends of said bridle supports.

10. Cargo handling apparatus adapted to be connected to a lifting device comprising a pair of hanger members hinged together at their inner ends and extending away from one another, a scoop bridle suspended from the outer end of each member, means biasing the outer ends of said members apart to hold said bridles apart, the outer ends of said hanger members being adapted to move toward one another against the force of said biasing means in response to lifting of the apparatus when said bridles are in lifting engagement with the cargo.

11. Cargo handling apparatus as set forth in claim 10 including means for guiding said bridles into lifting engagement with the cargo.

12. Cargo handling apparatus as set forth in claim 11 wherein said guiding means includes blocking means adapted to permit movement of said bridles from above to below said cargo and adapted to block movement of said bridles from below to above said cargo.

13. Cargo handling apparatus as set forth in claim 10 wherein each of said hanger members includes an arm and a bridle support extending generally peripendicular to said arm at the outer end of the latter, said bridles including a pair of cables and a cargo support member, said cables being connected at one end to said cargo support member and at the other end to the outer ends of said bridle supports.

14. Cargo handling apparatus adapted to be connected to a lifting device comprising a pair of arms hinged together at their inner ends, each arm having a bridle support extending laterally from its outer end, a bridle suspended from each bridle support, means extending between said arms biasing the outer ends of the latter apart, each of said bridles including a lifting member adapted to be placed under cargo, the outer ends of said arms moving toward one another when said lifting members are placed under the cargo and the apparatus is lifted.

15. Cargo handling apparatus as set forth in claim 2 wherein said guiding means includes a pair of movable plates adapted to be swung from a generally horizontal position to a retracted position by the weight of a bridle thereon, each plate being counter-weighted so as to swing back to said generally horizontal position after being swung to said retracted position by a bridle, each of said plates having a guiding portion for guiding a bridle into a cargo engaging position when the bridle is raised from a lowered position.

16. Cargo handling apparatus adapted to be connected to a lifting device, comprising a pair of cargo slings, each having a horizontally extending cargo engaging member supported at its ends by elongated lifting members converging as they proceed upwardly from the cargo engaging member, said cargo engaging members being of generally scoop-shape and having angularly related flanges adapted for engaging under and against the outer ends of cargo pallets, means for biasing the lower ends of said cargo slings apart to permit said cargo engaging members to be passed vertically along opposite vertical sides of the cargo on the cargo pallet, and means for guiding said cargo engaging members into lifting engagement with the cargo pallets in response to upward movement of said cargo engaging members from a position lower than the underside of the opposite ends of the cargo pallet to be engaged by the cargo engaging members.

References Cited

UNITED STATES PATENTS

| | | |
|---|---|---|
| 2,721,756 | 10/1955 | Markussen. |
| 3,167,341 | 1/1965 | Higgins _____ 294—74 X |
| 3,261,637 | 7/1966 | Bopp et al. _____ 294—110 X |

ROBERT G. SHERIDAN, *Primary Examiner.*